United States Patent
Gelli et al.

(10) Patent No.: US 12,086,547 B2
(45) Date of Patent: Sep. 10, 2024

(54) CROSS-DOMAIN NAMED ENTITY RECOGNITION USING KNOWLEDGE GRAPH

(71) Applicant: PAYPAL, INC., San Jose, CA (US)

(72) Inventors: Francesco Gelli, Singapore (SG); Van Hoang Nguyen, Singapore (SG)

(73) Assignee: PAYPAL, INC.

( * ) Notice: Subject to any disclaimer, the term of this patent is extended or adjusted under 35 U.S.C. 154(b) by 650 days.

(21) Appl. No.: 17/333,917

(22) Filed: May 28, 2021

(65) Prior Publication Data
US 2022/0382984 A1 Dec. 1, 2022

(51) Int. Cl.
| | | |
|---|---|---|
| G06F 40/295 | (2020.01) | |
| G06F 18/214 | (2023.01) | |
| G06F 40/284 | (2020.01) | |
| G06N 3/08 | (2023.01) | |
| G06N 5/02 | (2023.01) | |

(52) U.S. Cl.
CPC ........ *G06F 40/295* (2020.01); *G06F 18/2148* (2023.01); *G06F 40/284* (2020.01); *G06N 3/08* (2013.01); *G06N 5/02* (2013.01)

(58) Field of Classification Search
CPC .. G06F 40/295; G06F 18/2148; G06F 40/284; G06N 3/08; G06N 5/02
See application file for complete search history.

(56) References Cited

U.S. PATENT DOCUMENTS

| | | | | |
|---|---|---|---|---|
| 2011/0119576 | A1* | 5/2011 | Aumann | G06F 16/1744 715/255 |
| 2015/0235132 | A1* | 8/2015 | Allen | G06F 16/951 706/11 |
| 2018/0173696 | A1* | 6/2018 | Hosabettu | G06F 16/36 |
| 2020/0327590 | A1* | 10/2020 | Handelman | G06Q 30/0609 |
| 2021/0141793 | A1* | 5/2021 | Kar | G06F 16/243 |
| 2021/0142002 | A1* | 5/2021 | Cui | G06F 40/174 |

(Continued)

OTHER PUBLICATIONS

Ghosal et al., "KinGDOM: Knowledge-Guided DOMain adaptation for sentiment analysis", May 11, 2020, https://arxiv.org/abs/2005.0079). (Year: 2020).*

(Continued)

*Primary Examiner* — Daniel C Washburn
*Assistant Examiner* — Athar N Pasha
(74) *Attorney, Agent, or Firm* — Haynes and Boone, LLP

(57) ABSTRACT

Methods and systems are presented for generating and using a machine learning model configured to perform cross-domain named entity recognition. The machine learning model is generated to accept a sentence associated with a target domain and to predict, for at least a word in the sentence, a corresponding entity associated with the target domain, without having been trained using training data associated with the target domain. In particular, the machine learning model is trained using only training data associated with a source domain. Based on derived relationships between entities associated with the source domain and entities associated with the target domain, the machine learning model is configured to transfer knowledge associated with the source domain to the target domain such that the machine learning model can map words within a sentence to entities associated with the target domain.

20 Claims, 8 Drawing Sheets

(56) References Cited

U.S. PATENT DOCUMENTS

2021/0326881 A1* 10/2021 Handelman .............. G06N 3/08
2022/0129625 A1*  4/2022 Zucker ................... G06F 40/20
2022/0366142 A1* 11/2022 Liang .................... G06F 40/295

OTHER PUBLICATIONS

Devlin et al.; "BERT: Pre-training of Deep Bidirectional Transformers for Language Understanding"; Proceedings of the 2019 Conference of the North American Chapter of the Association for Computational Linguistics: Human Language Technologies, vol. 1 (Long and Short Papers); Association for Computational Linguistics, Minneapolis, Minnesota, 4171-4186. https://doi.org/10.18653/v1/N19-1423.

Fritzler et al.; "Few-Shot Classification in Named Entity Recognition Task"; Proceedings of the 34th ACM/SIGAPP Symposium on Applied Computing (Limassol, Cyprus) (SAC '19). Association for Computing Machinery, New York, NY, USA, 993-1000. https://doi.org/10.1145/3297280.3297378.

Hovy et al.; "OntoNotes: The 90% Solution"; Proceedings of the Human Language Technology Conference of the NAACL, Companion Volume: Short Papers; Association for Computational Linguistics, New York City, USA, 57-60.

Jia et al.; "Cross-domain NER using crossdomain language modeling"; ACL 2019—57th Annual Meeting of the Association for Computational Linguistics, Proceedings of the Conference (2020), 2464-2474. https://doi.org/10.18653/v1/p19-1236.

Jia et al.; "Multi-Cell Compositional LSTM for NER Domain Adaptation"; Proceedings of the 58th Annual Meeting of the Association for Computational Linguistics. Association for Computational Linguistics, Online, 5906-5917. https://doi.org/10.18653/v1/2020.acl-main.524.

Lim et al.; "Classifying and completing word analogies by machine learning"; International Journal of Approximate Reasoning 132 (2021), 1-25. https://doi.org/10.1016/j.ijar.2021.02.002.

Liu et al.; "CrossNER: Evaluating Cross-Domain Named Entity Recognition"; Mlm (2020). arXiv:2012.04373 http://arxiv.org/abs/2012.04373.

Lu et al.; "Visual attention model for name tagging in multimodal social media"; ACL 2018—56th Annual Meeting of the Association for Computational Linguistics, Proceedings of the Conference (Long Papers) 1 (2018), 1990-1999. https://doi.org/10.18653/v1/ p. 18-1185.

Nedellec et al.; "Overview of BioNLP Shared Task 2013"; Proceedings of the BioNLP Shared Task 2013 Workshop. Association for Computational Linguistics, Sofia, Bulgaria, 1-7.

Plank et al.; "Effective Measures of Domain Similarity for Parsing"; Proceedings of the 49th Annual Meeting of the Association for Computational Linguistics: Human Language Technologies; Association for Computational Linguistics, Portland, Oregon, USA, 1566-1576. https://www.aclweb.org/anthology, 11-1157.

Schlichtkrull et al.; "Modeling Relational Data with Graph Convolutional Networks"; The Semantic Web, Aldo Gangemi, Roberto Navigli, Maria-Esther Vidal, Pascal Hitzler, Raphaël Troncy, Laura Hollink, Anna Tordai, and Mehwish Alam (Eds.). Springer International Publishing, Cham, 593-607.

Speer et al.; "ConceptNet 5.5: An Open Multilingual Graph of General Knowledge"; Proceedings of the Thirty-First AAAI Conference on Artificial Intelligence (AAAI'17). AAAI Press, 4444-4451.

Tjong et al.; "Introduction to the CoNLL-2003 Shared Task: Language-Independent Named Entity Recognition"; Proceedings of the Seventh Conference on Natural Language Learning at HLT-NAACL 2003.142-147.

Vaswani et al.; "Attention is All you Need"; Advances in Neural Information Processing Systems, I. Guyon, U. V. Luxburg, S. Bengio, H.Wallach, R. Fergus, S. Vishwanathan, and R. Garnett (Eds.), vol. 30. Curran Associates, Inc. https://proceedings.neurips.cc/paper/2017/file/3f5ee243547dee91fbd053c1c4a845aa-Paper.pdf.

Yamada et al.; "LUKE: Deep Contextualized Entity Representations with Entity-aware Self-attention"; Proceedings of the 2020 Conference on Empirical Methods in Natural Language Processing (EMNLP). Association for Computational Linguistics, Online, 6442-6454. https://doi.org/10.18653/v1/2020.emnlp-main.523.

* cited by examiner

CROSS-DOMAIN NAMED ENTITY RECOGNITION USING KNOWLEDGE GRAPH

BACKGROUND

The present specification generally relates to machine learning, and more specifically, to configuring a machine learning model to perform cross-domain name entity predictions according to various embodiments of the disclosure.

RELATED ART

Named entity recognition (NER) is an information extraction process by which entities mentioned in unstructured text can be identified and classified. Machine learning models are often used in performing named entity recognition. However, in order to perform accurate named entity recognition, a large volume of annotated data (e.g., unstructured sentences that include pre-classified words) is required to train the machine learning models. Furthermore, name entities are often domain specific, that is, many name entities are usually specific to a particular domain. Thus, a machine learning model that is trained using training data associated with a particular domain can usually perform named entity recognition effectively only for that particular domain, and not any other domains.

Due to the substantial effort, computing resources, and time required to construct a large volume of annotated data, only training data associated with a small number of domains are typically available. Thus, in order to use machine learning models to perform named entity recognition in other domains for which training data is not available, there is a need for providing a machine learning model that can effectively and efficiently perform cross-domain named entity recognition.

Figure 1:
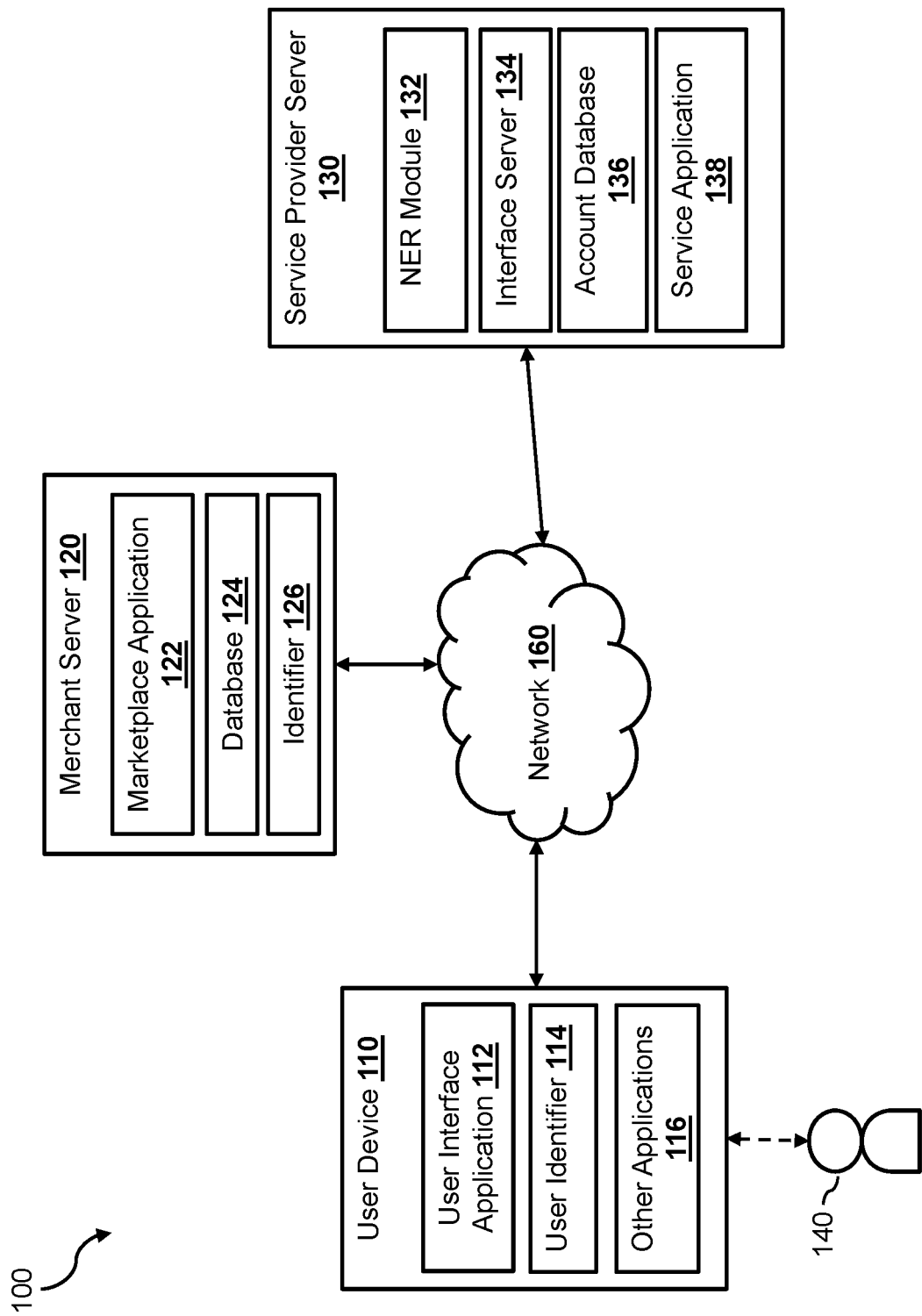
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for generating and using a machine learning model for performing cross-domain named entity recognition (NER). Named entity recognition can be used in a variety of applications. For example, named entity recognition can be used to enhance the understanding and interpretation of an unstructured sentence, by providing context and meaning to the words. The interpretation of the sentence may then be used to create structured data for storage, analysis, and/or automated responses. In one example, named entity recognition can be used to interpret a description provided by a third party (e.g., a product description from a merchant). In another example, named entity recognition can be used to interpret meaning and/or an intent of a user based on a chat utterance of the user. The meaning and/or the intent of the user may then be used to generate an automated response for the user.

As discussed above, name entities are typically domain specific. That is, name entities that are applicable to one domain are usually not applicable to another domain. For example, name entities such as a scientist, Nobel Prize, a chemical compound, etc. are specific only to the science domain (and not other domains) while name entities such as a musician, a Grammy award, a song, etc. are specific only to a music domain (and not other domains). Furthermore, certain words may be associated with different name entities when they are classified under different domains. For example, the words "Prince of Persia" may be classified as a person in a history domain, classified as a movie title in a movie domain, or classified as a game title in a video game domain.

Thus, conventionally, a machine learning model that is configured and trained using annotated data associated with a particular domain is limited to performing NER accurately (e.g., with an NER prediction accuracy rate above a predetermined threshold, etc.) for that particular domain, but not any other domains, which substantially limits the use of the machine learning model. In addition, since a sufficiently large volume of annotated data is available only for a small number of domains, it has been challenging historically to effectively tap into the potential of machine learning in the NER space.

According to various embodiments of the disclosure, a named entity recognition (NER) system may generate a machine learning model (e.g., an NER model) that is configured to perform cross-domain named entity recognition. In some embodiments, the NER system may configure the machine learning model using a domain ontology graph that represents relationships among different entities associated with different domains. The NER system may also train the machine learning model using annotated data associated with a first domain. By training the machine learning model using the annotated data associated with the first domain, the machine learning model is enabled to derive (learn) patterns associated with words within unstructured sentences in relation to entities associated with the domain such that the machine learning model may identify and classify words to entities associated with the first domain. The domain ontology graph provides the machine learning model the necessary relationships between the first domain and a second domain such that the machine learning model may transfer the knowledge (e.g., the derived patterns) from the first domain to the second domain. Based on the relationships between the first domain and the second domain and the knowledge derived for the first domain, the machine learning model may perform named entity recognition for the second domain without being trained using any annotated data associated with the second domain.

In some embodiments, the NER system may generate a NER model to include a sentence analysis module, an ontology analysis module, a domain integration module, and an entity mapping module. The sentence analysis module may be configured to tokenize words within a sentence and generate domain-independent token features for each token. The ontology analysis module may be configured to access a domain ontology graph representing relationships among entities associated with different domains. The ontology analysis module may be further configured to derive specific relationships between entities associated with a source domain (e.g., the first domain) and entities associated with a target domain (e.g., the second domain). In some embodiments, the ontology analysis module may generate an entity vector for each entity associated with the source domain or the target domain, where an entity vector of an entity may represent the entity and a relationship of the entity with another entity within the domain ontology graph.

In some embodiments, the domain integration module may be configured to transform domain-independent token features into domain-specific token features that are specific to the target domain based on the entity vectors generated by the ontology analysis module. The domain-specific token features may then be used by the entity mapping module to map each token to an entity associated with the target domain.

In some embodiments, the NER system may receive a request to generate a model for performing named entity recognition for the target domain. However, as discussed herein, training data associated with the target domain (e.g., sentences that include words annotated with entities associated with the target domain) may not be available. As such, the NER system may determine another domain (e.g., the source domain) that is related to the target domain, and for which training data (e.g., sentences that include words annotated with entities associated with the source domain) is available. In some embodiments, the NER system may determine such a different domain (e.g., the source domain) based on user input. In some embodiments, the NER system may determine the source domain based on analyzing the domain ontology graph. Based on the determining that the source domain, for which training data is available, is related to the second domain, the NER system may generate an NER model configured to perform named entity recognition for the target domain by training the NER model using only the training data associated with the source domain (without using training data associated with the target domain).

To train the NER model, sentences including words that are annotated with entities associated with the source domain may be accessed by the NER system. The NER system may iteratively train the NER model by providing one sentence (or one batch of sentence) to the NER model at a time. Upon receiving a sentence, the NER model may use the sentence analysis module to tokenize the words within the sentence, such that a token is generated for each corresponding word in the sentence. The sentence analysis module may then generate token features for each token. The token features of a token may indicate the corresponding word and the relationship of the corresponding word with other words within the sentence. In some embodiments, the token features generated by the sentence analysis module are domain-independent. That is, the token features are not specific to any one domain. For the same word within the same sentence, the sentence analysis module would produce the same token features regardless of the domain for which the named entity recognition is performed.

In some embodiments, the NER system may include a domain ontology graph that represents relationships among entities associated with different domains. As such, the ontology analysis module may analyze the domain ontology graph to derive relationships between entities associated with the source domain and entitles associated with the target domain. In some embodiments, the ontology analysis module may generate an entity vector for each entity associated with the source domain or the target domain. The entity vector of an entity may represent the entity and a relationship of the entity with one or more other entities within the domain ontology graph.

Based on the relationships between entities associated with the source domain and the entities associated with the target domain (e.g., the entity vectors), the domain integration module may transform the domain-independent token features of each token into domain-specific token features, where the domain-specific token features are specific to the target domain. The entity mapping module may then map, for at least a token in the sentence, based on the corresponding domain-specific token features, an entity associated with the target domain. However, as discussed herein, the training data used to train the NER model is annotated with entities associated with the source domain, and not entities associated with the target domain. Thus, the NER system may use a set of analogies to translate the predicted entity associated with the target domain to a corresponding entity associated with the source domain. The NER model may change one or more parameters within the model based on whether the translated entity matches the annotated entity of the word.

The NER system may continue to iteratively train the NER model using different annotated sentences in the training data and re-configure the parameters of the NER to improve the prediction performance of the NER model. After training the NER model, the NER system may use the trained NER model to perform named entity recognition for the target domain.

The NER system may receive a named entity recognition request that includes a sentence associated with the second domain. The NER system may provide the sentence to the NER model that has been trained using training data associated with the source domain. Similar to training the NER model, upon receiving the sentence, the NER model may use the sentence analysis module to tokenize the words within the sentence, such that a token is generated for each corresponding word in the sentence. The sentence analysis module may then generate token features for each token. The token features of a token may indicate the corresponding word and the relationship of the corresponding word with other words within the sentence. In some embodiments, the token features generated by the sentence analysis module are domain-independent.

In some embodiments, the ontology analysis module may generate (or obtain) an entity vector for each entity associated with the first domain or the second domain. The entity vector of an entity may represent the entity and a relationship of the entity with another entity within the domain ontology graph. Based on the relationships between entities associated with the first domain and the entities associated with the second domain (e.g., the entity vectors), the domain integration module may transform the domain-independent token features of each token into domain-specific token features, where the domain-specific token features are specific to the target domain. The entity mapping module may then map, for at least a token based on the corresponding domain-specific token features, an entity associated with the target domain. Since the mapped entity is associated with the target domain, unlike the training phase, the NER system may output the mapped entity for the word within the sentence without translating it to an entity in the source domain.

FIG. 1 illustrates an electronic transaction system 100, within which the NER system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, the user 140 may use the input component to interact with the UI application 112 (e.g., to add a new funding account, to perform an electronic purchase with a merchant associated with the merchant server 120, to provide information associated with the new funding account, to initiate an electronic payment transaction with the service provider server 130, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a named entity recognition (NER) module 132 that implements the NER system as discussed herein. The NER module 132 may be configured to develop one or more computer-based machine learning models that can be used by one or more other modules within the service provider server 130 (e.g., the interface server 134, the service application 138, etc.) for performing named entity recognition in one or more domains. Since the service provider server 130 acts as an intermediary between consumers and merchants to facilitate electronic payment transactions for purchasing goods and/or services in different categories, the NER module 132 may assist the service application in verifying product information associated with the purchase transactions. For example, when a consumer initiates a purchase transaction in association with a purchase with a merchant (e.g., via a merchant website associated with the merchant or via a service provider website associate with the service provider server 130), the merchant server 120 may provide a description of a product to the service provider server 130. For example, when the consumer is purchasing an item from a clothing store, the description may include "Havana 2100W Fine Printed 3XL White t-shirt."

The description of the product may be used by the service application 138 of the service provider server 130 to process the purchase transaction. In some embodiments, the service application 138 may classify the purchase transaction and/or assess a risk for the purchase transaction based at least in part on the description of the product. To assist the service application 138 in understanding and/or interpreting the description of the product, the NER module 132 may annotate the words in the description (which may be an unstructured sentence as illustrated in the example above) by recognizing corresponding entities associated with the words. For example, the NER module 132 may recognize that the word "Havana" corresponds to a brand name of a clothing manufacturer, the word "2100W" corresponds to a clothing style under a clothing manufacturer, the words "Fine Printed" also corresponds to a clothing style under a clothing manufacturer, the word "3XL" corresponds to a size of a clothing apparel, the word "white" corresponds to a color, and the word "t-shirt" corresponds to a type of clothing. The NER module 132 may annotate the words within the description based on the corresponding entities recognized by the NER module 132. The annotated description may then be used by the service application 138 to process the purchase transaction, such that the service application may categorize the type of products being purchased, a preference of a user who made the purchase, a risk associated with the purchase transaction (e.g., whether the description matches with a category of the merchant, etc.).

However, as discussed herein, the meaning of a word within a sentence may be dependent on a domain with which the context of the sentence is associated. Referring back to the example illustrated above, the word "Havana" may correspond to a clothing brand name within the "fashion" domain, but may correspond to a city within a "geography" (or a general) domain. Thus, the word "Havana" may have a different meaning within a product description "plane ticket to Havana" than the product description of a t-shirt as illustrated above. Since the service provider server 130 processes transactions for different kinds of merchants (e.g., merchants that sell different types of goods and/or services), the NER module 132 may perform the name entity based on a specific domain.

In some embodiments, the service application 138 and/or the NER module 132 may determine a domain for performing named entity recognition on a description based on a category of a merchant. For example, when the merchant is a clothing store, the service application 138 and/or the NER module 132 may determine that the named entity recognition should be performed within a "fashion" domain. On the other hand, if the merchant is a multi-media content delivery platform (e.g., Netflix), the service application 138 and/or NER module 132 may determine that the named entity recognition should be performed within an "entertainment" domain.

Figure 2:
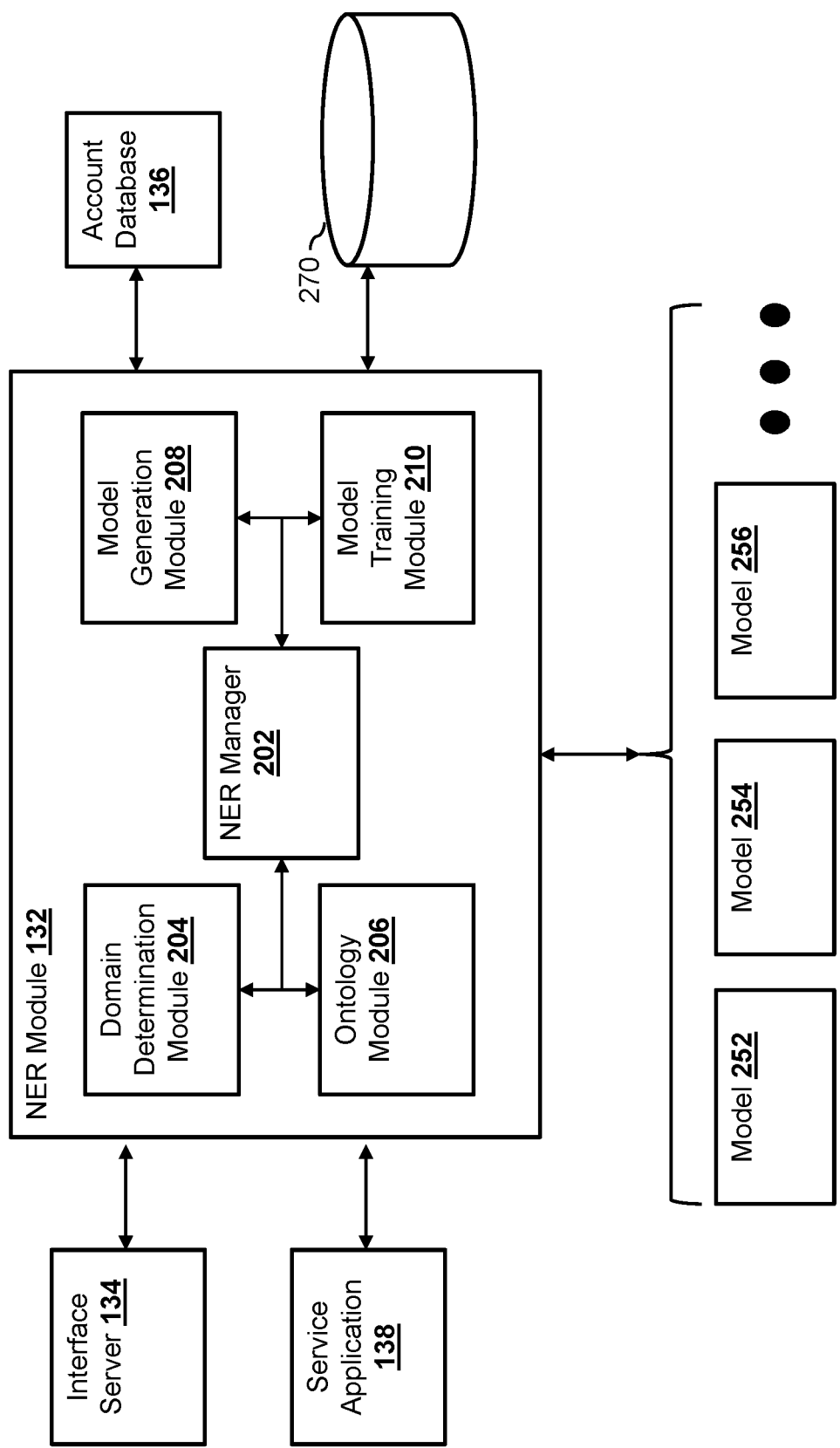
FIG. 2 is a block diagram illustrating a named entity recognition (NER) module according to an embodiment of the present disclosure.

FIG. 2 illustrates a block diagram of the NER module 132 according to an embodiment of the disclosure. The NER module 132 includes an NER manager 202, a domain determination module 204, an ontology module 206, a model generation module 208, and a model training module 210. In some embodiments, the NER manager 202 may use the domain determination module 204 to determine one or more domains that are associated with the service provider server 130. For example, the domain determination module 204 may analyze the merchants involved in transactions processed by the service application 138 and may determine one or more domains corresponding to the categories of the merchants (e.g., fashion, entertainment, travel, music, etc.). In some embodiments, the NER manager may use the model generation module 208 to generate NER models, such as NER models 252, 254, 256, etc., for performing named entity recognition for each of the one or more domains associated with the service provider server 130. In some embodiments, each of the NER models 252, 254, 256, etc. is a machine learning model.

In order to generate the NER models, the NER manager may first determine whether training data associated with the domains (e.g., annotated sentences that include words that have been annotated with entities associated with the domains) is available. If training data associated with a domain is available, the model generation module 208 may generate a machine learning model configured to receive words within a sentence as inputs and to output entities associated with words. The model training module 210 may use the training data associated with the domain to train the machine learning model such that the machine learning model may "learn" to predict the entities associated with words within sentences. However, as discussed herein, training data for some domains may not be available. When a domain associated with the service provider server 130 is not available, the NER manager 202 may generate NER models that are configured to perform cross-domain named entity recognition.

In some embodiments, the NER models, that are configured to perform cross-domain named entity recognition, are trained to perform named entity recognition for a target domain (e.g., a second domain), based on training data associated with a source domain (e.g., a first domain). In order for the NER models to transfer the knowledge associated with the source domain gained from the training data to the target domain, the NER manager 202 and/or the model generation module 208 may provide the NER models information associated with the relationships between the source domain and the target domain. In some embodiments, the NER manager 202 may use the ontology module 206 to create a domain ontology graph that represents relationships among entities associated with different domains.

Figure 3:
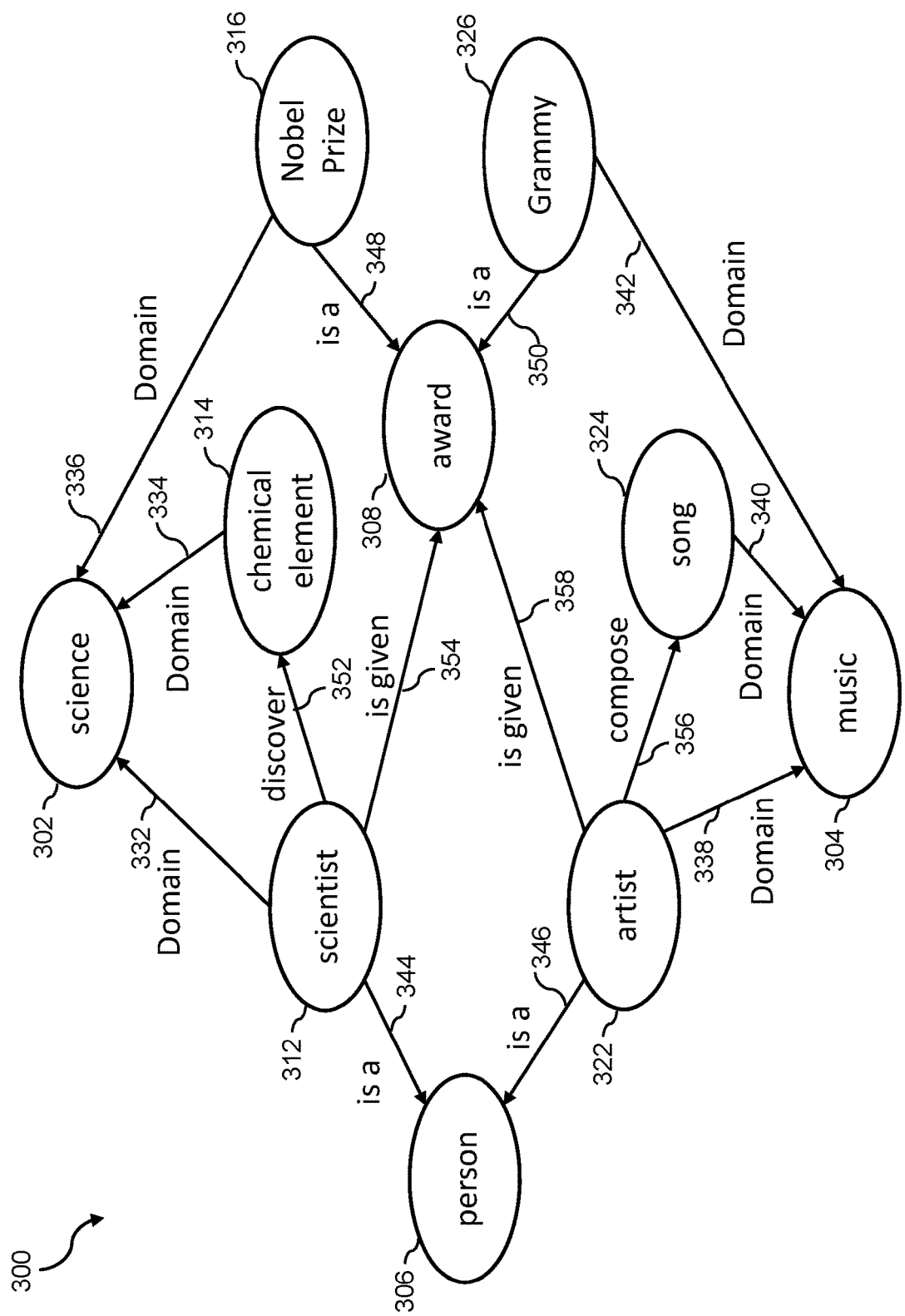
FIG. 3 illustrates an example domain ontology graph according to an embodiment of the present disclosure.

FIG. 3 illustrates an example domain ontology graph 300 generated by the ontology module 206 according to one embodiment of the disclosure. As shown, the domain ontology graph 300 includes nodes that represent domains and entities. For example, the domain ontology graph 300 includes domain nodes 302 and 304, representing a "science" domain and a "music" domain, respectively. The domain ontology graph 300 also includes entity nodes 306-326. For example, the entity node 306 represents a "person" entity, the entity node 308 represents an "award" entity, the entity node 312 represents a "scientist" entity, the entity node 314 represents a "chemical element" entity, the entity node 316 represents a "Nobel Prize" entity, the entity node 322 represents an "artist" entity, the entity node 324 represents a "song" entity, and the entity node 326 represents a "Grammy" entity.

Some of the entities may be associated with one or more domains, as illustrated by domain edges between the entity nodes and the corresponding domain node in the domain ontology graph 300. For example, the entity nodes 312, 314, and 316 are connected to the domain node 302 via domain edges 332-336, representing that the "scientist" entity, the "chemical element" entity, and the "Nobel Prize" entity are associated with the "science" domain. Similarly, the entity nodes 322, 324, and 326 are connected to the domain node 304 via domain edges 338-342, representing that the "artist" entity, the "song" entity, and the "Grammy" entity are associated with the "music" domain.

Furthermore, the domain ontology graph 300 may also indicate various types of relationships among different entities. In this regard, an edge that connects two entity nodes may specify the type of relationships between the corresponding entities. For example, the entity node 312 representing the "scientist" entity and the entity node 322 representing the "artist" entity are connected to the entity node 306 representing the "person" entity via edges 344 and 346, where the edges specify an "is a" relationship since, a scientist is a person, and an artist is also a person. Similarly, the entity node 316 representing the "Nobel Prize" entity and the entity node 326 representing the "Grammy" entity are connected to the entity node 308 representing the "award" entity via edges 348 and 350, where the edges specify an "is a" relationship since a Nobel Prize is an award, and a Grammy is also an award.

The entity node 312 representing the "scientist" entity is also connected to the entity node 314 representing the "chemical element" entity via an edge 352, where the edge 352 specifies a "discover" relationship, since scientists discover chemical elements. The entity node 312 representing the "scientist" entity is also connected to the entity node 308 representing the "award" entity via an edge 354, where the edge 354 specifies an "is given" relationship, since scientists are given awards.

The entity node 314 representing the "artist" entity is also connected to the entity node 324 representing the "song" entity via an edge 356, where the edge 356 specifies a "compose" relationship, since artists compose songs. The entity node 314 representing the "artist" entity is also connected to the entity node 308 representing the "award" entity via an edge 358, where the edge 358 specifies an "is given" relationship, since artists are given awards.

Even though the domain ontology graph 300 is shown to represent relationships among entities associated with two domains (e.g., the science domain and the music domain), the ontology module 204 may be configured to generate domain ontology graphs that represent relationships among entities associated with additional domains (e.g., 10 domains, 100 domains, etc.). For example, the domain ontology graph 300 may be a sub-graph that is part is a larger domain ontology graph generated by the ontology module 206.

In some embodiments, the model generation module 208 may configure the NER model to use the domain ontology graph 300 to transfer the knowledge from one domain (e.g., a source domain) to another domain (e.g., a target domain), such that the NER model can be used to perform named entity recognition for the target domain based on training data associated with the source domain.

Figure 4:
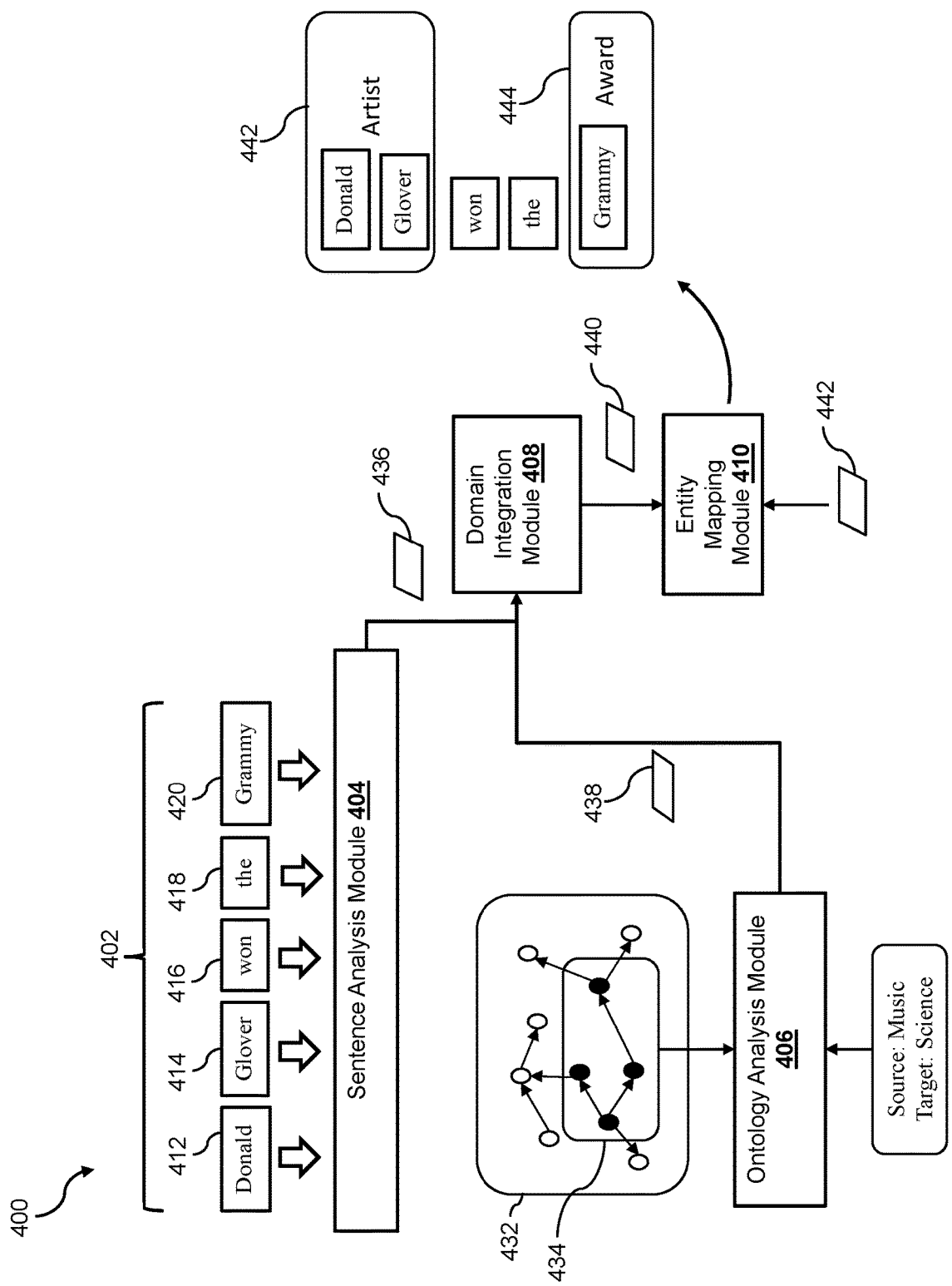
FIG. 4 illustrates an example NER model and training the NER model using training data associated with a source domain according to an embodiment of the present disclosure.

FIG. 4 illustrates an example NER model 400 configured to perform cross-domain named entity recognition and training of the NER model 400. As shown in FIG. 4, the NER model 400 generated by the model generation module 208 may include a sentence analysis module 404, an ontology analysis module 406, a domain integration module 408, and an entity mapping module 410. The sentence analysis module 404 may be configured to tokenize words within a sentence, and generate domain-independent token features for each token. The ontology analysis module 406 may be configured to access a domain ontology graph (e.g., the domain ontology graph 300 of FIG. 3) representing relationships among entities associated with different domains. The ontology analysis module 406 may be further configured to derive specific relationships between entities associated with a source domain (e.g., the first domain) and entities associated with a target domain (e.g., the second domain) based on the domain ontology graph. In some embodiments, the ontology analysis module 406 may generate an entity vector for each entity associated with the first domain or the second domain, where an entity vector of an entity may represent the entity and a relationship of the entity with another entity within the domain ontology graph.

In some embodiments, the domain integration module 408 may be configured to transform domain-independent token features into domain-specific token features that are specific to the second domain based on the entity vectors generated by the ontology analysis module 406. The domain-specific token features may then be used by the entity mapping module 410 to map each token to an entity associated with the second domain. The NER model 400 is generated to be flexible such that the NER model 400 can be configured and trained to perform cross-domain named entity recognition for any selected target domain based on training data associated with any selected source domain. For example, the NER manager 202 may use the domain determination module 204 to determine a target domain and a source domain for the NER model 400. In this example, the domain determination module 204 may determine a need for performing named entity recognition for the "science" domain based on requests received from other systems and/or modules associated with the service provider server 130 or based on the category of merchants involved in past transactions processed by the service application 138. In some embodiments, the domain determination module 204 may determine a source domain for the NER model 400 based on the target domain being the "science" domain. For example, the domain determination module 204 may identify a domain node representing the "science" domain (e.g., the domain node 302) within a domain ontology graph (e.g., the domain ontology graph 300). The domain determination module 204 may then traverse the domain ontology graph from the domain node 302 to determine a domain related to the "science" domain. In this example, the domain determination module 204 may determine that the "music" domain, represented by the domain node 304, is related to the "science" domain based on the connectedness between the "science" domain and the "music" domain (e.g., a number of direct and/or indirect connections between the domain nodes 302 and 304, etc.). In some embodiments, the domain determination module 204 may determine a source domain that has the highest connectedness with the target domain based on the domain ontology graph (e.g., the highest number of direct and/or indirect connections with the domain node representing the target domain, etc.).

Once a source domain is selected for the NER model 400, the model training module 210 may begin training the NER model using training data associated with the source domain. In some embodiments, the model training module 210 may iteratively train the NER model 400 based on the sentences containing words annotated with entities associated with the source domain (e.g., the "music" domain). For example, the model training module 210 may obtain a sentence 402 "Donald Glover won the Grammy" that is associated with the "music" domain. The sentence 402 may include one or more words, where at least some of the words are annotated with entities associated with the source domain (e.g., the "music" domain). In this example, the words "Donald Glover" are annotated with an "artist" entity associated with the "music" domain, indicating that the words "Donald Glover" corresponds to a name of a musical artist. The word "Grammy" is annotated with an "award" entity associated with the "music" domain, indicating that the word "Grammy" corresponds to a name of an award.

The model training module 210 may provide the words included in the sentence 402 to the sentence analysis module 404 of the NER model 400. As discussed herein, the sentence analysis module 404 may be configured to tokenize each word in the sentence 402, and generate domain-independent token features for each of the tokens 412-420. In this example, the sentence analysis module 404 may generate one or more tokens for each of the words in the sentence 402. In some embodiments, the domain-independent token features generated for each token represent characteristics of the word (e.g., letters in the word, letter arrangement of the word, a length of the word, etc.) and a context of the word within the sentence 402 (e.g., neighboring words, a position of the word within the sentence, etc.). The domain-independent token features generated by the sentence analysis module 404 are domain-independent because the sentence analysis module 404 generates the token features based on the word and the sentence alone, and does not take into consideration of the domain associated with the sentence 402. In some embodiments, the sentence analysis module 404 may generate the domain-independent token features in a vector format, such that the sentence analysis module 404 may output a vector for each token (e.g., representing each word in the sentence 402). In some embodiments, the sentence analysis module 404 may include a neural network that is configured and trained to produce a vector representing the domain-independent token features based on a word within a sentence. In this example, the sentence analysis module 404 may output six vectors 436 for the six tokens 412-420 based on the input sentence 402.

In some embodiments, the ontology analysis module 406 of the NER model 400 may access a domain ontology graph 432 that is similar to the domain ontology graph 300 illustrated in FIG. 3. The ontology analysis module 406 may then analyze the domain ontology graph 432 to determine relationships between entities associated with the source domain (e.g., the "music" domain) and entities associated with the target domain (e.g., the "science" domain). As discussed herein, the domain ontology graph 432 may represent entities associated with multiple domains, such as domains that are not part of the source and target domains. As such, the domain ontology graph may extract a sub-graph 434, which may include a portion of the domain ontology graph 432, where the sub-graph 434 may include domain nodes and entity nodes associated with the source domain and the target domain (e.g., nodes that represent the source domain and the target domain, nodes that represent the entities connected to the source domain and the target domain, and nodes that have a relationship with entities associated with the source domain and entities associated with the target domain).

In some embodiments, to determine what nodes are included in the sub-graph 434, the ontology analysis module 406 may identify entity nodes representing entities associated with the source domain and/or the target domain. The ontology analysis module 406 may then propagate one level in the domain ontology graph from the identified entity nodes to retrieve all of the neighboring nodes of the identified entity nodes. The ontology analysis module 406 may then include the identified entity nodes, all of the retrieved neighboring nodes, and the domain nodes representing the source domain and the target domain in the sub-graph 434. In this example, the sub-graph 434 may be identical to the domain ontology graph 300. In some embodiments, the ontology analysis module 406 may store the sub-graph 434 in a data storage (e.g., the data storage 270), such that the NER model 400 may use the sub-graph 434 without re-generating the sub-graph 434 in each iteration of the training process.

In some embodiments, the ontology analysis module 406 may include a graph neural network (e.g., a recurrent graph convolutional network) for capturing patterns observable in the local neighborhoods between the domain nodes (e.g., the domain nodes 302 and 304) representing the source domain and the target domain. For example, the neural network may be trained to learn the patterns between nodes within a sub-graph (e.g., the sub-graph 434), and to output, for each entity (or entity node), an entity vector representing relationships between the entity node with other entity nodes within the sub-graph 434. Thus, by analyzing the sub-graph 434, the ontology analysis module 406 may output a set of entity vectors 438, including an entity vector for each entity node within the sub-graph 434. The set of entity vectors 438 represent relationships between the entities (e.g., the "scientist" entity, the "associated with the source domain (e.g., the "music" domain) and the entities associated with the target domain (e.g., the "science" domain). In some embodiments, the ontology analysis module 406 may also store the sets of entity vectors 438 in the data storage 270 such that the NER model 400 can reuse the entity vectors 438 in each iteration of the training process (and subsequent process) without regenerating the entity vectors 438.

The set of token vectors 436 (e.g., domain-independent token features) and the set of entity vectors 438 may be provided to the domain integration module 408. In some embodiments, the domain integration module 408 may be configured to transform the domain-independent token features 436 associated with the words 412-420 of the sentence 402 into domain-specific token features 440 based on the relationships between entities associated with the source domain (e.g., the "music" domain) and entities associated with the target domain (e.g., the "science" domain) (e.g., the entity vectors 442). In some embodiments, for each token of the tokens 412-420, the domain integration module 408 may transform the domain-independent token features of the token into domain-specific token features.

In a non-limiting example, the domain integration module 408 may perform a multi-head attention (MHA) process based on the token feature vector generated by the sentence analysis module 404 and the entity vectors 438 generated by the ontology analysis module 406, where the token feature vector is used as the attention query and the entity vectors 438 are used as the keys in the MHA process. The domain integration module 408 may determine the domain-specific token features for the token by concatenating the domain-independent token features of the token to the result from the MHA process. In some embodiments, the domain integration module 408 may also determine whether the token corresponds to a node in the sub-graph 434. If it is determined that the token corresponds to a node within the sub-graph 434, the domain integration module 408 may also concatenate an entity vector associated with the node (e.g., the entity vector generated by the ontology analysis module 406 for the node) to the domain-specific token features of the token (e.g., the result of the MHA process and the domain-independent token features of the token).

In some embodiments, to reduce the amount of computational complexity, the domain integration module 408 may use a fully connected layer (FCN) to reduce the dimensionality of domain-specific token features of each token. The domain integration module 408 may provide the domain-specific token features 440 of the tokens 412-420 to the entity mapping module 410 for mapping each token to an entity.

In some embodiments, the entity mapping module 410 is configured to map each of the tokens 412-420 to an entity associated with the target domain (e.g., the "science" domain). For example, the entity mapping module 410 may compute a dot product of the domain-specific token features of each token with features of each entity (the entity vector) associated with the target domain. In some embodiments, the entity mapping module 410 may select an entity associated with the target domain that is most similar to the token based on the dot products (e.g., selecting one having the highest dot product, etc.). Thus, the entity mapping module 410 may determine an entity associated with the target domain (e.g., the "science" domain) for one or more of the tokens 412-420 based on the dot products.

However, since the training data (e.g., the annotated sentence 402) is annotated with entities associated with the source domain (e.g., the "music" domain), rather than entities associated with the target domain (e.g., the "science" domain), the entity mapping module 410 may have to translate the target domain entity mapped for each token into a corresponding source domain entity in order to train the NER model 400 (e.g., providing feedback to the NER model 400 based on comparing the selected entity and the actual annotation in the sentence 402). In some embodiments, the entity mapping module 410 may be configured to use analogies 442 between entities associated with the source domain and entities associated with the target domain to perform the entity transaction.

The analogies link each entity from the source domain to an entity from the target domain based on the relationship between the two entities. For example, an analogy may link the "scientist" entity from the "science" domain to the "artist" entity from the "music domain. Another analogy may link the "Nobel Prize" entity from the "science" domain to the "Grammy" entity from the "music" domain. In some embodiments, the entity mapping module 410 may receive the analogies 442 from a user who operates the NER model 400. In some embodiments, the entity mapping module 410 may determine the analogies 442 based on traversing and/or analyzing the sub-graph 434. For example, the entity mapping module 410 may determine a link between two entities when the nodes representing the two entities are connected to a common node.

Referring back to FIG. 3, the entity node 312 representing the "scientist" entity and the entity node 322 representing the "artist" entity are both connected to a common entity node 306 representing the "person" entity, indicating that both a scientist and an artist are persons. Similarly, the entity node 316 representing the "Nobel Prize" entity and the entity node 326 representing the "Grammy" entity are both connected to a common entity node 308 representing the "award" entity, indicating that both the Nobel Prize and the Grammy are awards. Thus, during the training of the NER model 400, the entity mapping module 410 may be configured to translate the target domain entity determined for a token into a source domain entity. For example, when the entity mapping module 410 maps the words "Donald Glover" to a "scientist" entity, the entity mapping module 410 may translate the "scientist" entity into an "artist" entity associated with the "music" domain before outputting the translated entity. The NER model 400 may then provide an output 442, indicating a translated entity (e.g., the "artist" entity) for the words "Donald Glover," and another output 444, indicating a translated entity (e.g., the "award" entity) for the word "Grammy."

The model training module 210 may then provide feedback to the NER model 400 based on a comparison between the annotations of the sentence 402 and the entities provided by the NER model 400. When the annotation of the sentence 402 does not match the entity provided by the NER model 400, the model training module 210 may adjust one or more parameters of the NER model 400. One or more loss functions may be used to optimize the parameters of the NER model 400 based on the analogies, in order to improve the named entity recognition performance of the NER model 400. For example, the one or more loss functions may be used to minimize the deviations between (1) the link between the source domain and a first entity associated with the source domain and (2) the link between the target domain and a second entity associated with the source domain, where the first entity and the second entity are related based on an analogy.

The model training module 210 may continue to provide a sentence (selected from the training data) to the NER model 400, obtain one or more translated entity outputs corresponding to one or more words within the sentence, and provide feedback to the NER model 400 to continue to adjust and improve the prediction accuracy of the NER model 400.

Once the NER model 400 is trained, the NER manager 202 may begin using the trained NER module 400 for performing named entity recognition for the target domain (e.g., the "science" domain). For example, the interface server 134 and/or the service application 138 may transmit a request to the NER module 132 for annotating one or more sentences. In some embodiments, the sentence may be a user utterance obtained during an online chat session between the service provider server 130 and a user (e.g., the user 140). The annotated sentence may be used by the interface server 134 (and/or a chat bot, etc.) to provide automated interaction (e.g., an automated response) with the user. In some embodiments, the sentence may be a product description provided by the merchant server 120 in association with a purchase transaction processed by the service application 138. The annotated sentence may be used by the service application 138 to process the purchase transaction (e.g., the authorize or deny the purchase transaction) and/or to update information associated with a user account in the account database 136.

Figure 5:
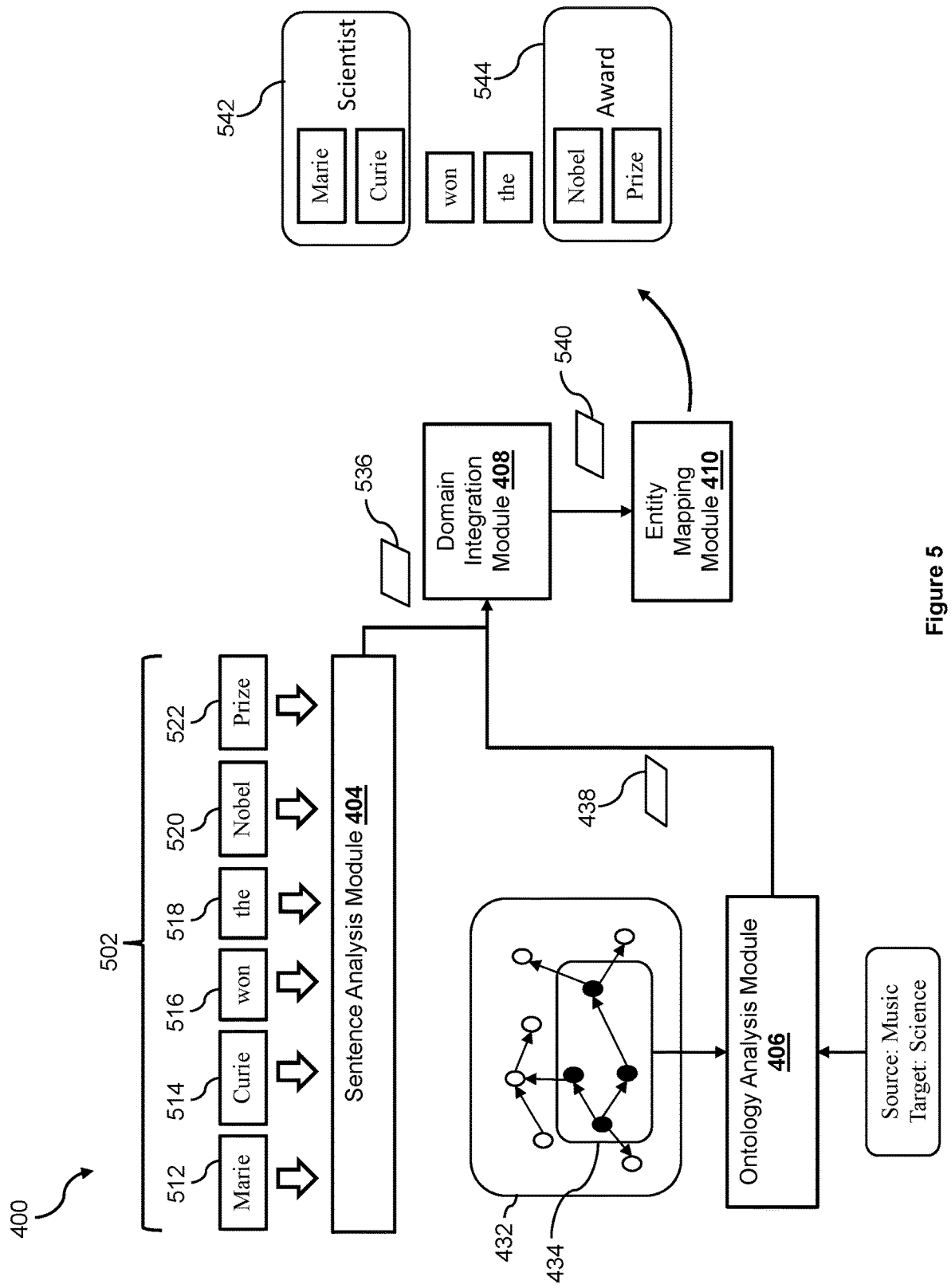
FIG. 5 illustrates using the NER model to perform named entity recognition for a target domain according to an embodiment of the present disclosure.

FIG. 5 illustrates the process of performing named entity recognition on a sentence 502 by the NER model 400. As shown, the sentence 502 is provided to the NER model 400 (e.g., by the NER manager 202). In this example, the sentence 502 is associated with the "science" domain and includes the words "Marie Curie won the Nobel Prize." Similar to the training process described above by reference to FIG. 4, upon receiving the sentence 502, the sentence analysis module 404 may tokenize each of the words in the sentence 502 by generating tokens 512-522 to represent the words. The sentence analysis module 404 may also determine domain-independent token features for each of the tokens 512-522. In this example, the sentence analysis module 404 may determine six sets of domain-independent token features 536 for the six tokens 512-522, and may provide the domain-independent token features 536 to the domain integration module 408.

The ontology analysis module 406 may access the domain ontology graph 432, and may extract the sub-graph 434 based on the source domain (e.g., the "music" domain) and the target domain (e.g., the "science" domain) associated with the NER model 400. The ontology analysis module 406 may extract the sub-graph 434 from the domain ontology graph 432 based on the source domain and the target domain associated with the NER model 400 using the techniques described herein. The ontology analysis module 406 may determine entity vectors 438 for each entity associated with the source domain or the target domain based on the sub-graph 434. In some embodiments, if the entity vectors 438 are stored in the data storage 270 during the training phase, the ontology analysis module 406 may access the entity vectors 438 from the data storage 270 without regenerating them. The ontology analysis module 406 may provide the entity vectors 438 to the domain integration module 408.

The domain integration module 408 may transform the domain-independent token features of each of the tokens 512-522 into domain-specific token features 540 associated with the target domain (e.g., the "science" domain) based on the entity vectors 438, using the techniques described herein. The entity mapping module 410 may map the domain-specific token features associated with a token to an entity associated with the target domain (e.g., the "science" domain). Since the sentence 502 is associated with the target domain, the entity mapping module 410 no longer needs to perform the transaction to the corresponding entities in the source domain as it did during the training process. In this example, the NER model 400 determines that the words "Marie Curie" correspond to the "scientist" entity, and the words "Nobel Prize" correspond to the "award" entity. The NER manager 202 may annotate the sentence 502 based on the entities determined by the NER model 400, and provide the annotated sentence to the interface server 134 and/or the service application 138. The interface server 134 and/or the service application 138 may use the annotated sentence for providing automatic dialogue with a user and/or processing an electronic transaction.

Figure 6:
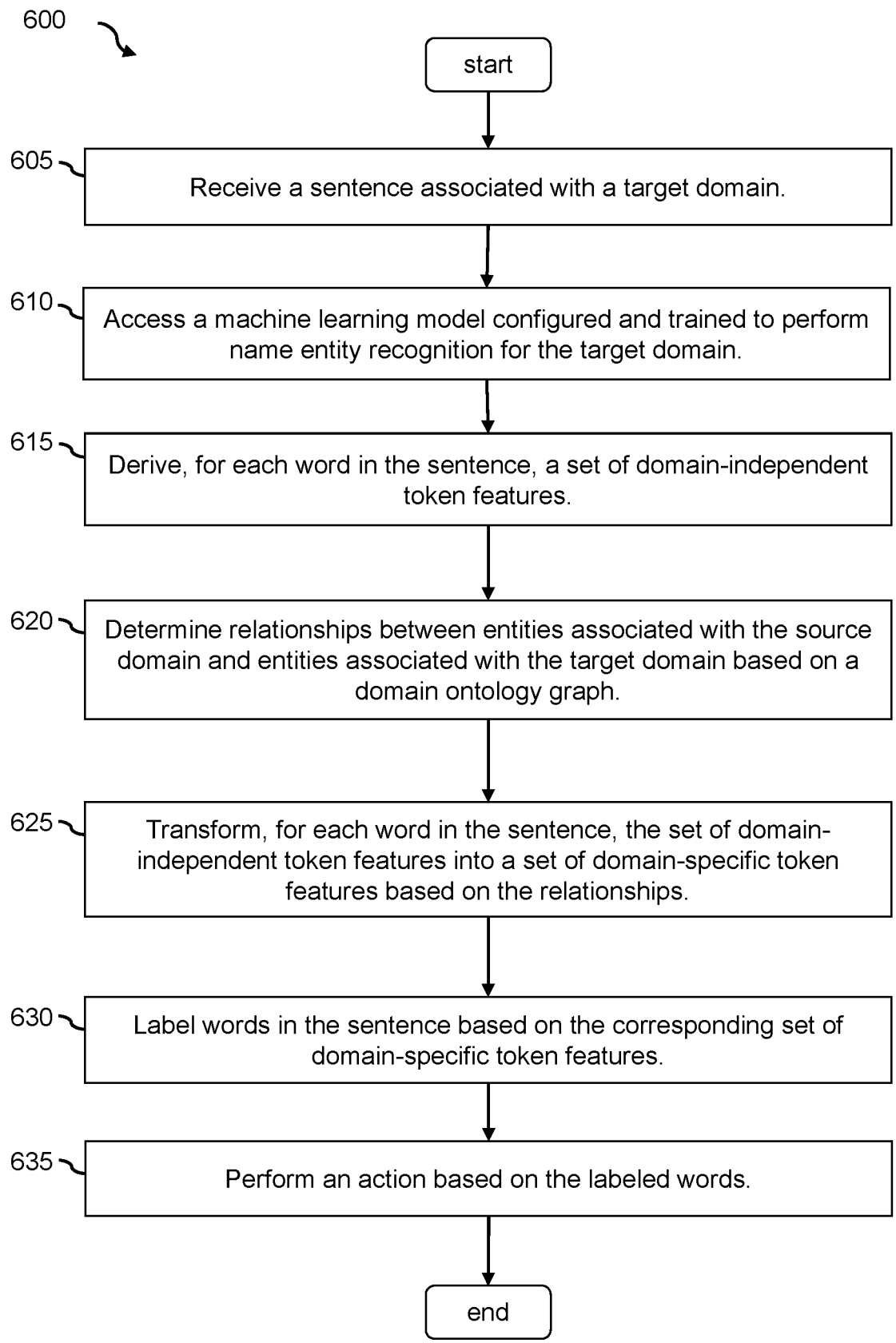
FIG. 6 is a flowchart showing a process of using the NER model to perform named entity recognition according to an embodiment of the present disclosure.

FIG. 6 illustrates a process 600 for performing named entity recognition for a target domain using a machine learning model trained with training data associated with a source domain according to various embodiments of the disclosure. In some embodiments, at least a portion of the process 600 may be performed by the NER module 132. The process 600 begins by receiving (at step 605) a sentence associated with a target domain and accessing (at step 610) a machine learning model configured and trained to perform named entity recognition for the target domain. For example, the NER manager 202 may use the model generation module 208 to generate one or more NER models (e.g., the NER model 400) configured to perform cross-domain named entity recognition. In some embodiments, the model generation module 208 may generate multiple NER models configured to perform named entity recognition for different target domains. For example, the model generation module 208 may configure the NER model 400 to perform named entity recognition for the "science" domain.

As discussed herein, training data associated with the target domain may not be available. As such, the NER manager 202 may use the domain determination module 204 to determine a source domain (for which training data is available) that is related to the target domain, for example, by analyzing a domain ontology graph (e.g., the domain ontology graph 300). In one example, the domain determination module 204 may determine that the "science" domain is related to the "music" domain, and training data for the "music" domain is available.

The NER manager 202 may then use the model training module 210 to train the NER model 400 using training data associated with a source domain (e.g., the "music" domain). The trained NER model 400 may then be used to perform named entity recognition for the target domain (e.g., the "science" domain). Thus, upon receiving a request for performing named entity recognition on a sentence (e.g., from the interface server 134 and/or the service application 138), the NER manager 202 may first use the domain determination module 204 to determine a domain associated with the sentence. For example, when the sentence is a product description from a merchant, the domain determination module 204 may determine the domain associated with the sentence based on a category of the merchant (e.g., a fashion store, an electronic equipment store, etc.). When the sentence is an utterance from a user during a chat session, the domain determination module 204 may analyze the sentence to determine an intent (e.g., a subject matter) of the sentence. The domain determination module 204 may then map the intent to a domain. In this example, the domain determination module 204 may determine that the sentence is associated with the "science" domain.

Based on the domain associated with the sentence, the NER manager 202 may access an NER model that is configured and trained to perform named entity recognition for that domain (e.g., the NER model 400). The process 600 then derives (at step 615), for each word in the sentence, a set of domain-independent token features. For example, the sentence analysis module 404 of the NER model 400 may tokenize each word within the sentence, and may determine domain-independent token features for each of the tokenized word.

The process 600 then determines (at step 620) relationships between entities associated with the source domain and entities associated with the target domain based on a domain ontology graph. For example, the ontology analysis module 406 of the NER model 400 may access a domain ontology graph (e.g., the domain ontology graph 432). In some embodiments, the ontology analysis module 406 may extracts a sub-graph (e.g., the sub-graph 434) from the domain ontology graph 432 based on the source domain and the target domain associated with the NER model 400. Using the sub-graph 434, instead of the entire domain ontology graph 432, for analysis advantageously improves the computer processing speed for performing the functionalities described herein. The ontology analysis module 406 may then determine relationships among entities within the sub-graph 434. In some embodiments, the ontology analysis module 406 may generate an entity vector for each entity represented within the sub-graph 434, where an entity vector indicates the entity and relationships between the entity and other entities within the sub-graph 434.

The process 600 transforms (at step 625), for each word in the sentence, the set of domain-independent token features into a set of domain-specific token features based on the relationships. For example, the domain integration module 408 may transform the domain-independent token features into domain-specific token features that are specific to the target domain (e.g., the "science" domain) based on the relationships determined by the ontology analysis module 406.

The process 600 then labels (at step 630) words in the sentence based on the corresponding set of domain-specific token features and performs (at step 635) an action based on the labeled words. For example, the entity mapping module 410 may map a set of domain-specific token features to an entity associated with the target domain, and may label (e.g., annotate) the corresponding word in the sentence. Once the words in the sentence are annotated, the NER manager 202 may provide the annotated sentence to other modules, such as the interface server 134 and/or the service application 138, for further processing. For example, when the unstructured sentence is a product description provided by a merchant, the annotated sentence can be used to generate structured data (e.g., key-value pair) for classifying the purchase transaction and/or storing information associated with the transaction. Using the example provided above where the product description includes the unstructured sentence of "Havana 2100W Fine Printed 3XL White t-shirt." The NER module 132 may annotate the unstructured sentence by associating the word "Havana" with the brand name entity, associating the words "2100W Fine Printed" with a clothing style entity under the brand, and associating the word "3XL" with the size entity. Based on the annotated sentence, structured data can be generated. For example, a key-value pair of "brand=Havana" may be generated, another key-value pair of "style=2100W Fine Printed" may be generated, and yet another key-value pair of "size=3XL" may be generated. The key-value pairs may be used to classify whether the transaction is a fraudulent transaction (e.g., whether the size, brand, or style purchased by the user are consistent with prior purchases), for generating recommendation for the user, and/or for updating a profile of the user.

Figure 7:
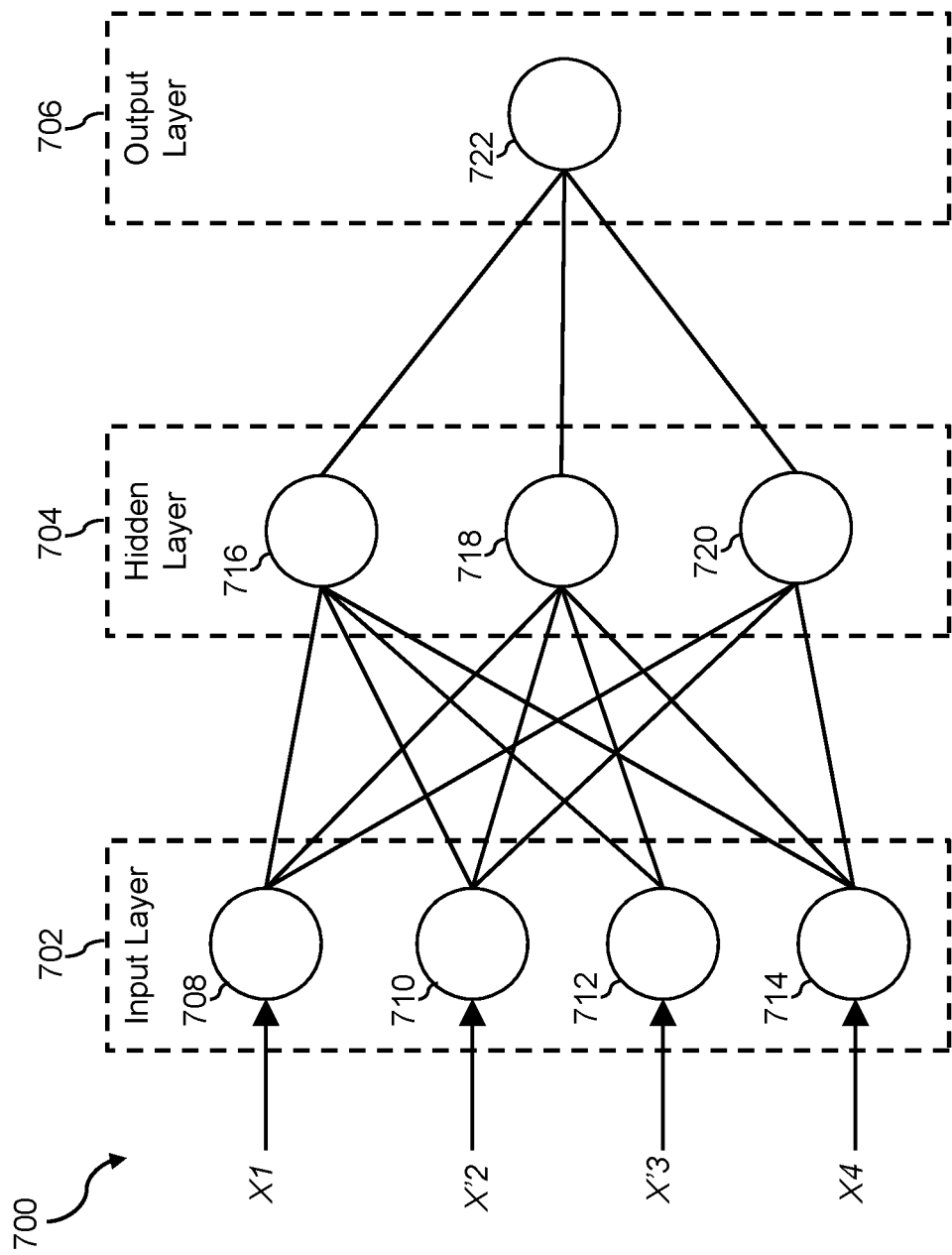
FIG. 7 illustrates an example neural network that can be used to implement a machine learning model according to an embodiment of the present disclosure.

FIG. 7 illustrates an example artificial neural network 700 that may be used to implement any machine learning components of the models 252, 254, 256, and/or 400, such as the sentence analysis module 404, the ontology analysis module 406, the domain integration module 408, and the entity mapping module 410. As shown, the artificial neural network 700 includes three layers—an input layer 702, a hidden layer 704, and an output layer 706. Each of the layers 702, 704, and 706 may include one or more nodes. For example, the input layer 702 includes nodes 708-714, the hidden layer 704 includes nodes 716-720, and the output layer 706 includes a node 722. In this example, each node in a layer is connected to every node in an adjacent layer. For example, the node 708 in the input layer 702 is connected to all of the nodes 716-720 in the hidden layer 704. Similarly, the node 716 in the hidden layer is connected to all of the nodes 708-714 in the input layer 702 and the node 722 in the output layer 706. Although only one hidden layer is shown for the artificial neural network 700, it has been contemplated that the artificial neural network 700 used to implement any one of the computer-based models 252, 254, 256, and 400 may include as many hidden layers as necessary.

In this example, the artificial neural network 700 receives a set of inputs and produces an output. Each node in the input layer 402 may correspond to a distinct input. For example, when the artificial neural network 700 is used to implement the entity mapping module 410, each node in the input layer 702 may correspond to a distinct domain-specific token feature of a token. When the artificial neural network 700 is used to implement the sentence analysis module 404, each node in the input layer 702 may correspond to a distinct word in a sentence. When the artificial neural network 700 is used to implement the ontology analysis module, each node in the input layer 702 may correspond to a domain ontology graph, a distinct section of a domain ontology graph, or a distinct node or a distinct edge within a domain ontology graph. When the artificial neural network 700 is used to implement the domain integration module 408, each node in the input layer 702 may correspond to a distinct domain-independent token feature of a token and/or an entity vector.

In some embodiments, each of the nodes 716-720 in the hidden layer 704 generates a representation, which may include a mathematical computation (or algorithm) that produces a value based on the input values received from the nodes 708-714. The mathematical computation may include assigning different weights (e.g., node weights, etc.) to each of the data values received from the nodes 708-714. The nodes 716-720 may include different algorithms and/or different weights assigned to the data variables from the nodes 708-714 such that each of the nodes 716-720 may produce a different value based on the same input values received from the nodes 708-714. In some embodiments, the weights that are initially assigned to the features (or input values) for each of the nodes 716-720 may be randomly generated (e.g., using a computer randomizer). The values generated by the nodes 716-720 may be used by the node 722 in the output layer 706 to produce an output value for the artificial neural network 700. When the artificial neural network 700 is used to implement the entity mapping module 410, the output value produced by the artificial neural network 700 may indicate an entity associated with a target domain or a source domain. When the artificial neural network 700 is used to implement the sentence analysis module 404, the output value produced by the artificial neural network 700 may include a set of domain-independent token features. When the artificial neural network 700 is used to implement the ontology analysis module 406, the output value produced by the artificial neural network 700 may include a set of entity vectors. When the artificial neural network 700 is used to implement the domain integration module 408, the output value produced by the artificial neural network 700 may include a set of domain-specific token features.

The artificial neural network 700 may be trained by using training data. By providing training data to the artificial neural network 700, the nodes 716-720 in the hidden layer 704 may be trained (adjusted) such that an optimal output (e.g., an entity) is produced in the output layer 706 based on the training data. By continuously providing different sets of training data, and penalizing the artificial neural network 700 when the output of the artificial neural network 700 is incorrect (e.g., when the determined entity is inconsistent with the annotation, etc.), the artificial neural network 700 (and specifically, the representations of the nodes in the hidden layer 704) may be trained (adjusted) to improve its performance in named entity recognition. Adjusting the artificial neural network 700 may include adjusting the weights associated with each node in the hidden layer 704.

Figure 8:
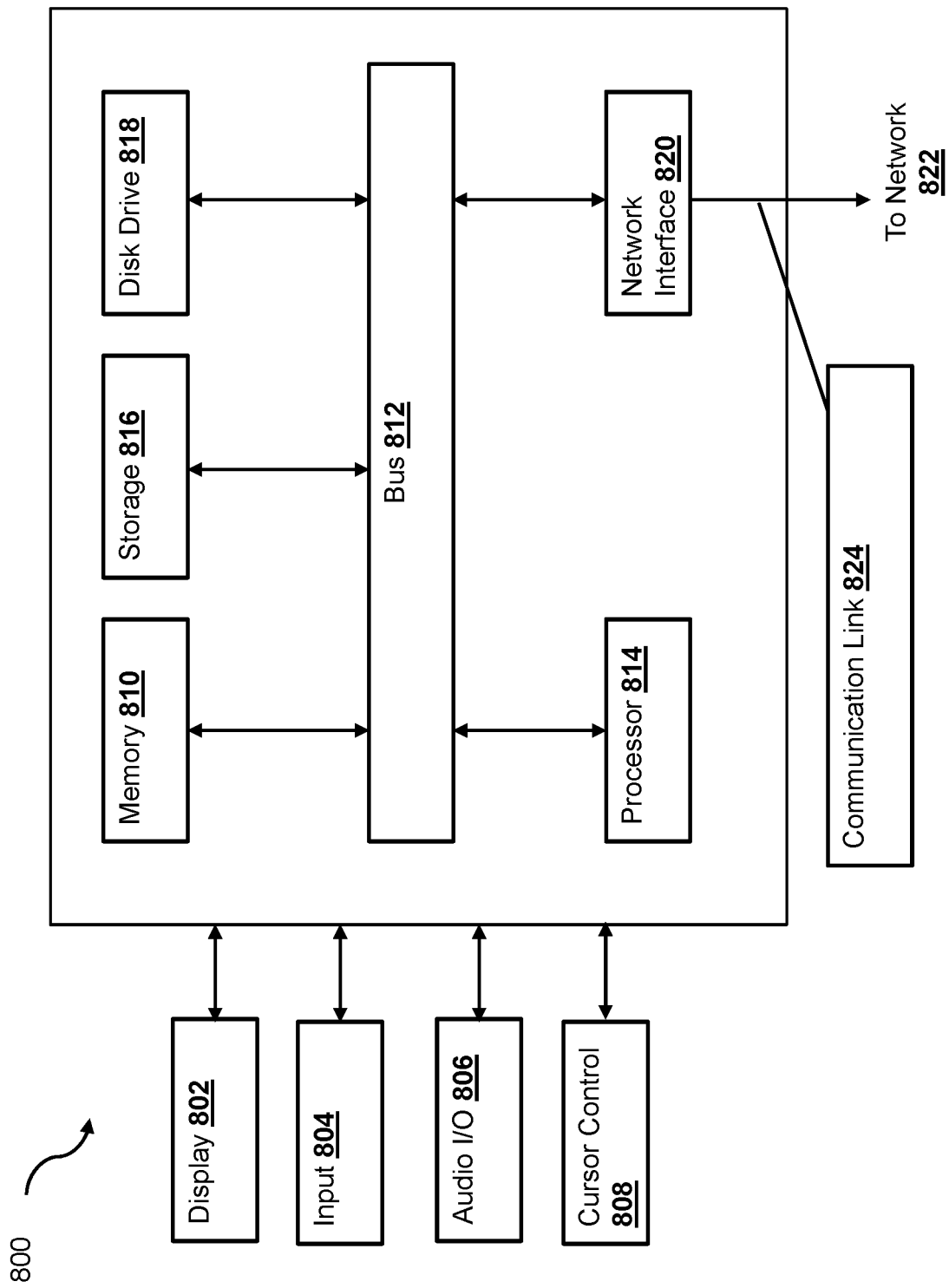
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818

(e.g., a solid-state drive, a hard drive). The computer system 800 performs specific operations by the processor 814 and other components by executing one or more sequences of instructions contained in the system memory component 810. For example, the processor 814 can perform the cross-domain named entity recognition functionalities described herein, for example, according to the process 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        receiving a first sentence including a plurality of words;
        identifying, from a plurality of domains, a particular domain associated with the first sentence;
        accessing a machine learning model configured to perform entity recognition for the particular domain, wherein the machine learning model was trained using training data associated with a source domain different from the particular domain, and wherein the machine learning model was trained based on (i) providing, to the machine learning model, a second sentence comprising a particular word annotated with a label associated with the source domain, (ii) obtaining, from the machine learning model and for the particular word, a first entity prediction associated with the particular domain, (iii) mapping the first entity prediction to a second entity prediction associated with the source domain based on an analogy between an entity associated with the source domain and an entity associated with the particular domain, and (iv) comparing the second entity prediction against the label;
        deriving, for each word in the plurality of words of the first sentence, a corresponding set of domain-independent token features representing the word and a context associated with the word within the sentence;
        transforming, using the machine learning model and for each word in the sentence, the corresponding set of domain-independent token features to a corresponding set of domain-specific token features that is specific for the particular domain; and
        annotating the first sentence, wherein the annotating comprises labeling a first word within the first sentence with an entity associated with the particular domain based on the set of domain-specific token features corresponding to the first word.

2. The system of claim 1, wherein the operations further comprise:
    deriving relationships between a first set of entities associated with the particular domain and a second set of entities associated with the source domain based on a domain ontology graph.

3. The system of claim 2, wherein the deriving the relationships comprises generating, for each entity associated with the particular domain, an entity vector representing one or more relationships between the entity and other entities associated with the source domain.

4. The system of claim 2, wherein the first entity prediction is mapped to the second entity prediction based on the relationships.

5. The system of claim 1, wherein the mapping comprises:
determining that a first entity associated with the first entity prediction is related to a second entity associated with the second entity prediction based on a common entity connected to both the first entity and the second entity in a domain ontology graph.

6. The system of claim 1, wherein the transforming comprises transforming a first set of domain-independent token features into a first set of domain-specific token features, wherein the first set of domain-specific token features are specific to the particular domain.

7. The system of claim 6, wherein the transforming the first set of domain-independent token features comprises performing a multi-head attention operation using the first set of domain-independent token features as a query for the multi-head attention operation.

8. The system of claim 1, wherein the first sentence is a product description of a product associated with a transaction request, and wherein the operations further comprise:
determining a risk associated with the transaction request based on the annotated first sentence; and
authorizing or denying the transaction request based on the risk.

9. A method, comprising:
receiving, by one or more hardware processors, a first sentence comprising a plurality of words;
identifying, by the one or more hardware processors from a plurality of domains, a particular domain associated with the first sentence;
accessing, by the one or more hardware processors, a machine learning model configured to perform entity recognition for the particular domain, wherein the machine learning model was trained using training data associated with a source domain different from the particular domain, and wherein the machine learning model was trained based on (i) providing, to the machine learning model, a second sentence comprising a particular word annotated with a label associated with the source domain, (ii) obtaining, from the machine learning model and for the particular word, a first entity prediction associated with the particular domain, (iii) mapping the first entity prediction to a second entity prediction associated with the source domain based on an analogy between an entity associated with the source domain and an entity associated with the particular domain, and (iv) comparing the second entity prediction against the label;
deriving, by the one or more hardware processors for each word in the plurality of words of the first sentence, a corresponding set of domain-independent token features representing the word and a context associated with the word within the first sentence;
transforming, by the one or more hardware processors using the machine learning model and for each word in the first sentence, the corresponding set of domain-independent token features to a corresponding set of domain-specific token features that is specific for the particular domain; and
annotating, by the one or more hardware processors, the first sentence, wherein the annotating comprises labeling a first word within the first sentence with an entity associated with the particular domain based on the set of domain-specific token features corresponding to the first word.

10. The method of claim 9, further comprising training the machine learning model.

11. The method of claim 9, wherein the machine model was trained further based on providing feedback to the machine learning model based on whether the second entity prediction corresponds to the label.

12. The method of claim 9, further comprising:
identifying, from the plurality of domains, the source domain that is related to the particular domain based on a domain ontology graph.

13. The method of claim 9, further comprising:
redacting the sentence by obscuring the first word based on the entity; and
transmitting the redacted sentence to a device.

14. The method of claim 9, further comprising presenting the annotated first sentence on a device.

15. A non-transitory machine-readable medium having stored thereon machine-readable instructions executable to cause a machine to perform operations comprising:
receiving a first sentence comprising a plurality of words;
identifying, from a plurality of domains, a particular domain associated with the first sentence;
accessing a machine learning model configured to perform entity recognition for the particular domain, wherein the machine learning model was trained using training data associated with a source domain different from the particular domain, and wherein the machine learning model was trained based on (i) providing, to the machine learning model, a second sentence comprising a particular word annotated with a label associated with the source domain, (ii) obtaining, from the machine learning model and for the particular word, a first entity prediction associated with the particular domain, (iii) mapping the first entity prediction to a second entity prediction associated with the source domain based on an analogy between an entity associated with the source domain and an entity associated with the particular domain, and (iv) comparing the second entity prediction against the label;
deriving, for each word in the plurality of words of the first sentence, a corresponding set of domain-independent token features representing the word and a context associated with the word within the first sentence;
transforming, using the machine learning model and for each word in the sentence, the corresponding set of domain-independent token features to a corresponding set of domain-specific token features that is specific for the particular domain; and
annotating the sentence, wherein the annotating comprises labeling a first word within the first sentence with an entity associated with the particular domain based on the set of domain-specific token features corresponding to the first word.

16. The non-transitory machine-readable medium of claim 15, wherein the machine learning model was not trained with data associated with the particular domain.

17. The non-transitory machine-readable medium of claim 15, wherein the operations further comprise:
deriving relationships between a first set of entities associated with the particular domain and a second set of entities associated with the source domain based on a domain ontology graph.

18. The non-transitory machine-readable medium of claim 17, wherein the operations further comprise:
generating the domain ontology graph based on combining ontologies associated with the plurality of domains.

19. The non-transitory machine-readable medium of claim 17, wherein the first entity prediction is mapped to the second entity prediction based on the relationships.

20. The non-transitory machine-readable medium of claim 15, wherein the mapping comprises:
determining that a first entity associated with the first entity prediction is related to a second entity associated with the second entity prediction based on a common entity connected to both of the first entity and the second entity in a domain ontology graph.

\* \* \* \* \*